(12) United States Patent
Frerking et al.

(10) Patent No.: US 12,548,174 B2
(45) Date of Patent: Feb. 10, 2026

(54) METHOD AND APPARATUS OF OBTAINING BODY DEPTH INFORMATION FOR A PATIENT

(71) Applicant: KONINKLIJKE PHILIPS N.V., Eindhoven (NL)

(72) Inventors: Lena Christina Frerking, Hamburg (DE); Julien Thomas Senegas, Hamburg (DE); Daniel Bystrov, Hamburg (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 117 days.

(21) Appl. No.: 18/279,896

(22) PCT Filed: Feb. 23, 2022

(86) PCT No.: PCT/EP2022/054469
§ 371 (c)(1),
(2) Date: Sep. 1, 2023

(87) PCT Pub. No.: WO2022/184514
PCT Pub. Date: Sep. 9, 2022

(65) Prior Publication Data
US 2024/0153114 A1 May 9, 2024

(30) Foreign Application Priority Data
Mar. 2, 2021 (EP) .................................... 21160149
Mar. 4, 2021 (EP) .................................... 21160787

(51) Int. Cl.
*G06T 7/50* (2017.01)
*A61B 5/00* (2006.01)
(Continued)

(52) U.S. Cl.
CPC .............. *G06T 7/50* (2017.01); *A61B 5/0037* (2013.01); *A61B 5/704* (2013.01); *G06T 3/18* (2024.01);
(Continued)

(58) Field of Classification Search
CPC .... G06T 7/62; G06T 3/18; G06T 7/66; G06T 7/50; G06T 2207/10081;
(Continued)

(56) References Cited

U.S. PATENT DOCUMENTS 10,004,465 B2 * 6/2018 Krauss .................... A61B 6/544
10,430,551 B2 * 10/2019 Wang ..................... G16H 30/20
(Continued)

OTHER PUBLICATIONS

Rock J, Gupta T, Thorsen J, Gwak J, Shin D, Hoiem D. Completing 3d object shape from one depth image. InProceedings of the IEEE conference on computer vision and pattern recognition 2015 (pp. 2484-2493).*
(Continued)

*Primary Examiner* — Phu K Nguyen
(74) *Attorney, Agent, or Firm* — Larry Liberchuk (57) ABSTRACT

A method is provided of obtaining body depth information for a patient who is lying on patient support. A patient support depth map of the upper surface of the patient support is obtained without the patient as well as an image and patient depth map of the patient on the patient support. Landmark body positions of the patient are extracted from the image so that points in a region of interest can be mapped to points of a template, using the identified landmark body positions. A body thickness is obtained for said points using the template, the depth value for the respective point and the patient support depth value for the respective point.

15 Claims, 7 Drawing Sheets

(51) Int. Cl.
*G06T 3/18* (2024.01)
*G06T 7/62* (2017.01)
*G06T 7/66* (2017.01)

(52) U.S. Cl.
CPC .............. *G06T 7/62* (2017.01); *G06T 7/66* (2017.01); *G06T 2207/10028* (2013.01); *G06T 2207/10081* (2013.01); *G06T 2207/10088* (2013.01); *G06T 2207/30196* (2013.01)

(58) Field of Classification Search
CPC . G06T 2207/30196; G06T 2207/10088; G06T 2207/10028; A61B 6/0407; A61B 5/704; A61B 6/545; A61B 5/0037; A61B 6/544; A61B 6/463; A61B 6/032; A61N 5/1049; A61N 2005/1061
USPC ........................................................ 345/428
See application file for complete search history.

(56) References Cited

U.S. PATENT DOCUMENTS

| | | | | |
|---|---|---|---|---|
| 11,406,471 B1 * | 8/2022 | Paulsen | ............... | H04N 13/239 |
| 11,547,323 B2 * | 1/2023 | Pai | ..................... | G06V 10/147 |
| 2016/0262714 A1 | 9/2016 | Krauss | | |
| 2017/0220709 A1 | 8/2017 | Wan | | |
| 2017/0249423 A1 | 8/2017 | Wang | | |
| 2017/0311841 A1 | 11/2017 | Rothgang | | |

OTHER PUBLICATIONS

Wang Y, Wei X, Liu F, Chen J, Zhou Y, Shen W, Fishman EK, Yuille AL. Deep distance transform for tubular structure segmentation in ct scans. InProceedings of the IEEE/CVF Conference on Computer Vision and Pattern Recognition 2020 (pp. 3833-3842).*
Bookstein FL. Shape and the information in medical images: A decade of the morphometric synthesis. Computer vision and image understanding. May 1, 1997;66(2):97-118.*
PCT International Search Report, International application No. PCT/EP2022/054469, May 11, 2022.
Booig R. et al., "Accuracy of Automated Patient Positioning in CT Using a 3D Camera for Body Contour Detection", European Radiology, vol. 29, issue4, pp. 2079-2088c, 2019.
Saltybaeva N. et al., "Vertical Off-Centering Affects Organ Dose in Chest CT: Evidence from Monte Carlo Simulations in Anthropomorphic Phantoms", Medical Physics, vol. 44, issue 11, pp. 5697-5704, 2017.
Karanam S. et al., "Towards Contactless Patient Positioning", IEEE Transactions on Medical Imaging, vol. 39, No. 8, pp. 2701-2710, Aug. 2020.

* cited by examiner

METHOD AND APPARATUS OF OBTAINING BODY DEPTH INFORMATION FOR A PATIENT

FIELD OF THE INVENTION

The invention relates to a method and apparatus of obtaining body depth information for a patient, in particular for use during medical imaging.

BACKGROUND OF THE INVENTION

In medical imaging, knowledge about the exact height and thickness of the region to be scanned is an essential factor.

Especially in CT or PET scanning, the scanned region has to be positioned in the center of the scanner. This is important to ensure that the radiation dose is concentrated at the right spot.

The bow-tie filter of a CT scanner leads to a higher radiation dose in the center compared to the outer regions. If the region of interest is not centered exactly, a larger dose hits the surrounding organs. The region of interest itself thus receives a lower dose, which leads to a reduced image quality. In order to place the region of interest in the center of the scanner, its vertical center needs to be identified.

For scanning modalities in which the height of the patient support may be adjusted, such as a CT scanner, this adjustment enables the vertical center of the region of interest and of the scanner to be equalized.

Similarly, in MR imaging it is important to know the height of the region of interest for proper scan planning. Even though the patient support height cannot be changed in this case, the scan protocol can be adapted in such a way that the magnetic field is adapted to scan the desired anatomical region with a defined off center offset with respect to the magnetic isocenter.

For regular diagnostic X-ray applications, the measure of the body thickness is also an important parameter to optimize the exposure parameters and therefore the overall X-ray dose received by the patient.

Thus the body thickness and/or location of the center of the body thickness is of interest for various different types of medical scanner.

The vertical center of the scan region is usually determined manually by a medical technology assistant (MTA) based on the visual appearance. Without any further input, the MTA can just guess the location of the center, which is naturally not very exact. An offset of only 20 mm or more has been shown to have significant impact on the radiation dose and also results in reduced image quality.

There is therefore a need for an accurate determination of body thickness and/or vertical center location to enable optimum conditions to be set for medical scanning procedures.

SUMMARY OF THE INVENTION

The invention is defined by the claims.

According to examples in accordance with an aspect of the invention, there is provided a method of obtaining body depth information for a patient who is lying on patient support, comprising:

obtaining a patient support depth map of the upper surface of the patient support without the patient using a depth camera;

obtaining an image of the patient lying on the patient support using an overhead camera;

identifying landmark body positions of the patient from the image;

obtaining a patient depth map of the upper surface of the patient on the patient support using the depth camera;

mapping points in a region of interest to points of a template, using the identified landmark body positions; and determining a body thickness for said points using the template, the patient depth value for the respective point and the patient support depth value for the respective point.

This method obtains a depth map of the upper surface of the patient (which may be the front, back or side depending if they are prone, supine or decubitus). This patient depth map is processed using a template, in particular by mapping points of the captured depth information to points of the template which correspond to the same body location. The body locations of the patient are matched to the template using identified landmark body positions of the patient, which have been identified using an overhead camera (which may be the same camera as the depth camera). The image for identifying landmarks is registered with the depth map camera, either because the same camera is used, or because there is a calibration step.

The mapping may involve mapping both the patient depth map and the patient support depth map to the template, or mapping derived depth values (e.g. a depth difference between the patient depth map and the patient support depth map) to the template. In either case, location information at which depth information is obtained is mapped to the template so that the body location for that depth information is matched with the body location of the template.

The template thus links each point of patient depth information to known body locations.

A body thickness at each point (or at a set of points of interest) may then be determined, using the template, and the knowledge of the patient support depth and the depth of the top surface of the patient. The set of points is for example within a scan range of interest, for example of a MR or CT examination.

In particular, the template may comprise a statistical model, said model comprising with a function for each of said points enabling a mapping from a depth parameter to a thickness value based on historical measurements of patients on patient supports. Thus, based on statistical modelling using historical measurements of patients on patient supports, the surface depth for each body location can be converted to an actual body thickness, thereby taking account of the non-measured gap between the patient and the patient support at the particular point. This gap varies across the area of the patient. In addition, since the patient depth map also include clothes, blankets etc., above the patient's body, this also can be taken into account in the statistical modelling.

Mapping points at which depth information is obtained to points of a template for example comprises warping a mask by fitting landmark body positions of the template to the identified landmark body positions.

Determining a body thickness for said points for example comprises using a statistical model, the model comprising a function for each of said points which maps from a depth parameter to a thickness value.

Thus, depth information at each point is converted to a thickness value, based on a statistical model built up using historical patient data. In the statistical model the function of mapping from the depth parameter to the thickness value can be based on a trained neural network using historical patient data pertaining to any specific patient measurements.

The statistical model for example implements a mapping between (i) a depth difference between the patient depth value and the patient support depth value at a particular point and (ii) the patient body thickness at that point. This depth difference is thus the depth parameter mentioned above, and it may be considered to be an altitude map over the patient support. In this way, the measured depth from the unoccupied patient support is converted to a body thickness (i.e. the measured depth less the gap under the patient and less a clothing thickness).

A vertical center position may be determined for each of said points as the measured depth of the surface of the patent lowered by a specific ratio of the patient thickness, dependent on the target anatomy, e.g. half when the anatomy is an entire body section. Thus, the patient thickness enables a position of the vertical center of the target anatomy to be derived. This enables the most suitable alignment to be provided between the patient support and the scanner or else enables the scan parameters to be set to the most suitable values.

The method may further comprise displaying an image derived from the patient depth map, the patient support depth map and one or more estimated vertical center positions. This may be used by a scanner technician to set the scan conditions, such as the most suitable height for the patient support.

The method for example comprises displaying a sagittal image and an axial intersection image, each representing the body upper and lower surfaces and optionally one or more estimated vertical center positions.

The method may comprise determining an overall vertical body center position for an arbitrary region from the body thickness information for said points. This may be used to set the scan conditions, such as the patient support height. Thus, the method may for example comprise generating a patient support height setting based on the overall vertical body center position.

Determining the overall vertical body center position may comprise obtaining an average body center position for all of said points or a weighted average body center position for all of said points.

Alternatively, determining the overall vertical body center position may comprise:
determining a slice center position for each of a set of parallel slices within the given region; and
obtaining the overall vertical body center position as the average slice center position for all considered slices.
This is for example suitable for a CT scanner.

Each slice is for example perpendicular to a body axis of the patient, and the average slice center position is taken for multiple slices in the body axis direction.

The method may comprise deriving a desired position of the patient support from the determined body thickness, in particular from the overall vertical body center position. This may be used by a clinician, or it may be part of an automated control of the patient support position.

The method may further comprise obtaining a volume of a region of interest of the patient using the body thickness for said points. This may be used for setting an X-ray dose or setting SAR parameters of a CT scan.

The invention also provides a computer program comprising computer program code which is adapted, when said program is run on a computer, to implement the method defined above.

The invention also provides a scanning system, comprising:
a patient support;
a scanner for scanning a patient lying on the patient support;
an input for receiving image data from an imaging system from which landmarks may be identified, and a depth map; and
a controller which is adapted to run the computer program defined above.

The controller may be further adapted to derive a desired position of the patient support (e.g. from the determined body thickness, and in particular from the vertical center position), and to control the position of the patient support to adopt the desired position.

This enables a complete system integration of the camera system, patient support (e.g. patient couch) and display system for presenting information to the clinician. It enables the patient support to be brought to the desired height in a way which is visible to the operator.

The scanning system may further comprise a display for displaying an image derived from the depth map, the patient support and one or more estimated vertical center positions.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides method of obtaining body depth information for a patient who is lying on patient support. A depth map of the upper surface of the patient support is obtained without the patient as well as an image and depth map of the patient prone or supine on the patient support. Landmark body positions of the patient are extracted from the image so that points in a region of interest can be mapped to points of a template, using the identified landmark body positions. A body thickness is obtained for said points using the template, the depth value for the respective point and the patient support depth value for the respective point.

The invention may be applied to any imaging technology such as a CT scanner, an MRI scanner or an X-ray imaging system.

Figure 1:
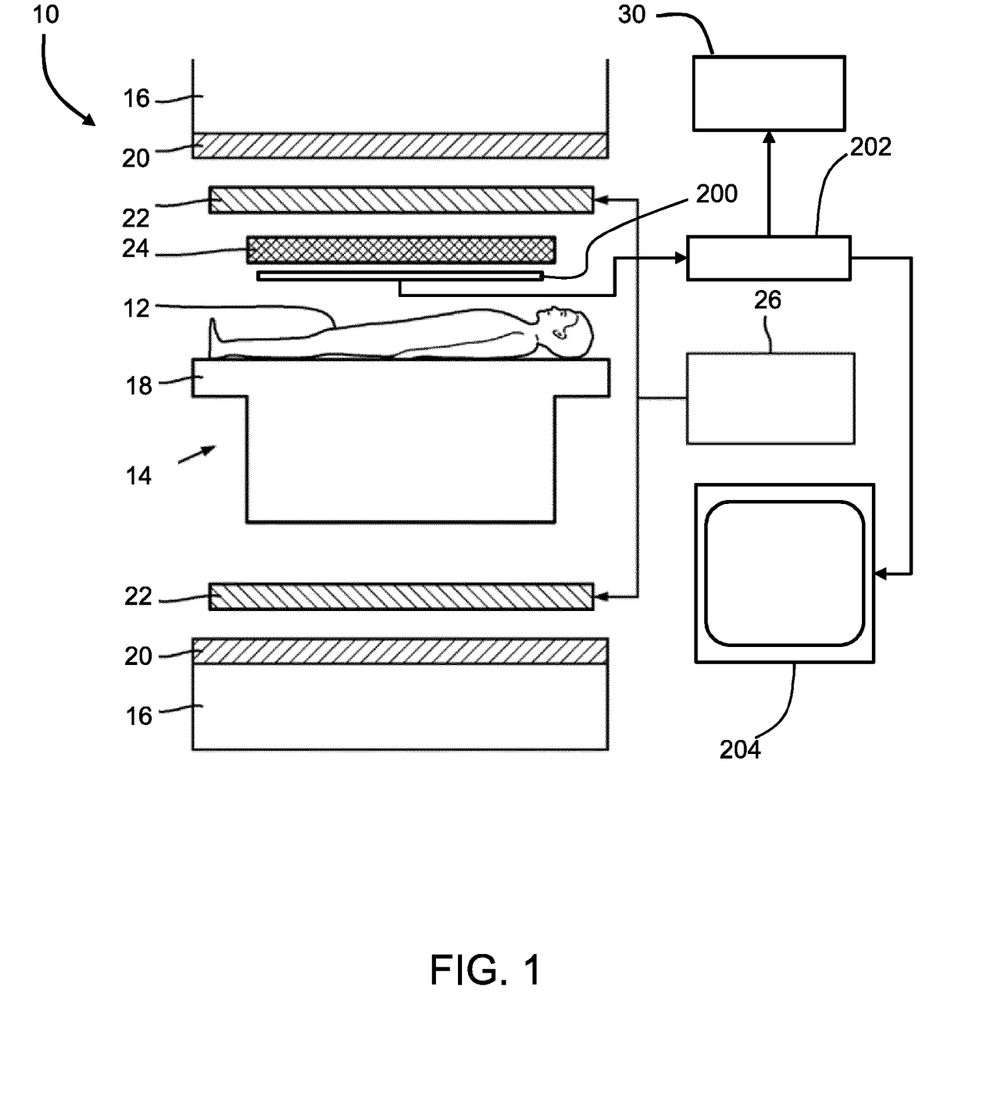
FIG. 1 shows a conventional a MRI system modified in accordance with the invention.

By way of example, FIG. 1 shows a conventional a MRI system 10 modified in accordance with the invention.

The MRI system 10 is used for MRI examination of a patient 12 in an examination area 14 within the bore of a superconducting magnet 16, which is used for generating a high static magnetic field. For positioning the patient 12 in the examination area 14, the patient 12 is positioned on a patient support 18, which may be driven into and out of the examination area 14 within the bore of the superconducting magnet 16.

The MRI system 10 is only shown with its most fundamental components. In this respect, the MRI system 10 comprises a gradient coil 20 within the bore of the superconducting magnet 16 as well as RF transmit coils 22 and a RF receiver coil 24. The RF transmit coils 22 emit RF pulses, which are supplied from a RF transmitter 26, and generate a radio frequency magnetic field within the bore of the superconducting magnet 16.

A computing system 30 serves as an operator console for controlling the MRI system. The console has an output device such as a monitor and an input device such as a keyboard, mouse, etc. Software resident on the console 30 allows the operator to interact with and/or operate the MRI system 10 via a graphical user interface (GUI) or otherwise. As is well known by one of ordinary skill in the art, by transmitting RF pulses which have an orthogonal polarization to the magnetic field generated by the superconducting magnet 16 and matching the Larmor frequency of the nucleons of interest, the spins of the nucleons can be excited and brought into phase, and a deflection of their net magnetization from the direction of the field of the superconducting magnet 16 is obtained so that a transversal component in relation to the longitudinal component of the net magnetization is generated.

After termination of the RF pulse, the relaxation process of the longitudinal and reversal components of the net magnetization begin until the net magnetization has returned to its equilibrium state. Magnetic resonance signals, which are generated by the processing magnetization are detected by means of the RF receiver coil 24.

The received magnetic resonance signals are time-based amplitude signals, which are further Fourier transformed to frequency-based magnetic resonance spectrum signals and further processed for generating a magnetic resonance image of the nucleons of interest.

The RF transmitter 26 comprises an RF amplifier for generating RF pulses and for forwarding these RF pulses to the RF transmit coil 22 of the MRI system 10. Further, the RF transmitter 26 typically comprises a capacitor bank which is coupled to the RF amplifier, for storing electric energy and for providing the RF amplifier with a current for generating the RF pulses. A mains power supply is coupled to the capacitor bank, for generating a charging current for charging the capacitor bank with electric energy.

The patient 12 is shown supine on the patient support 18, but the patient could equally be prone or decubitus.

To the extent described above, the Mill system is entirely convention.

The modification in accordance with the invention comprises an imaging system 200 installed above the patient 12 for generating an image from which landmarks may be identified, and also a patient depth map. There may be a 2D imaging camera and a separate depth camera or there may be a combined imaging system.

Figure 2:
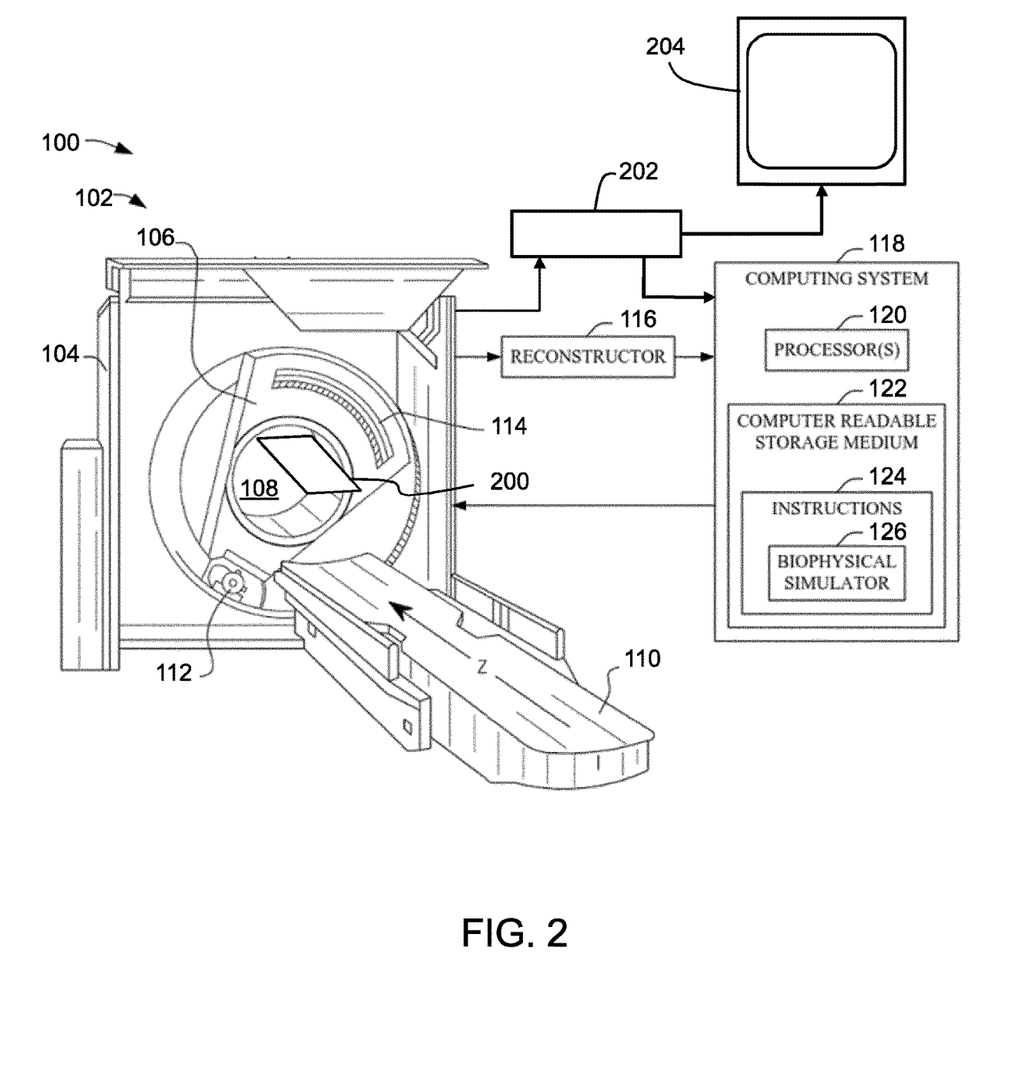
FIG. 2 shows a conventional a CT scanner system modified in accordance with the invention.

FIG. 2 shows a conventional a CT scanner system 100 modified in accordance with the invention.

The system 100 includes a CT scanner 102 configured for spectral (multi-energy) imaging. The CT scanner 102 includes a generally stationary gantry 104 and a rotating gantry 106, which is rotatably supported by the stationary gantry 104 and rotates around an examination region 108 about a z-axis. A subject support 110, such as a couch, supports an object or subject in the examination region 108.

A radiation source 112, such as an x-ray tube, is rotatably supported by the rotating gantry 106, rotates with the rotating gantry 106, and emits radiation that traverses the examination region 108. The radiation source 112 may include a single broad spectrum x-ray tube or a single x-ray tube configured to switch between at least two different emission voltages (e.g., 80 kVp and 140 kVp) during scanning. There may be two or more x-ray tubes configured to emit radiation having different mean spectra.

A radiation sensitive detector array 114 subtends an angular arc opposite the radiation source 112 across the examination region 108. The radiation sensitive detector array 114 detects radiation traversing the examination region 108 and generates an electrical signal(s) (projection data) indicative thereof. Where the radiation source 112 includes a single broad spectrum x-ray tube, the radiation sensitive detector array 112 includes energy-resolving detectors (e.g., direct conversion photon counting detectors, at least two sets of scintillators with different spectral sensitivities (multi-layer), etc.). With kVp switching and multi-tube configurations, the detector array 114 can include single layer detectors, direct conversion photon counting detectors, and/or multi-layer detectors. The direct conversion photon counting detectors may include a conversion material such as CdTe, CdZnTe, Si, Ge, GaAs, or other direct conversion material.

A reconstructor 116 receives spectral projection data from the detector array 114 and reconstructs spectral volumetric image data such as sCCTA image data, a high-energy image, a low energy image, a photoelectric image, a Compton scatter image, an iodine image, a calcium image, a virtual non-contrast image, a bone image, a soft tissue image, and/or other basis material image. The reconstructor 116 can also reconstruct non-spectral volumetric image data, e.g., by combining spectral projection data and/or spectral volumetric image data. Generally, the spectral projection data and/or spectral volumetric image data will include data for at least two different energies and/or energy ranges.

As for the MRI system of FIG. 1, a computing system 118 serves as an operator console. The console 118 has an output device such as a monitor and an input device such as a keyboard, mouse, etc. Software resident on the console 118 allows the operator to interact with and/or operate the scanner 102 via a graphical user interface (GUI) or otherwise. The console 118 further includes a processor 120 including a computer readable storage medium 122 which includes instructions 124 for at least a biophysical simulator 126.

The biophysical simulator 126 is configured to process at least the spectral volumetric image data generated by the reconstructor 116 and/or other imaging system to perform a biophysical simulation.

To the extent described above, the CT scanner system is entirely convention.

The modification in accordance with the invention again comprises an imaging system 200 installed above the patient support 110 for generating an image from which landmarks may be identified, and also a patient depth map. There may again be a 2D imaging camera and a separate depth camera or there may be a combined imaging system.

The modification of the invention will now be described in more detail, and the description below applies equally to the implementation of the invention to any scanning modality.

The fields of view of the depth camera and the 2D imaging camera (if they are separate hardware components) are aligned or calibrated to each other, so that a correspondence is known between the field of view of the imaging camera and the depth camera. In most 3D cameras, the depth sensor and the 2D (color) sensor are physically separated, such that the corresponding lenses and optical centers are slightly shifted and tilted with respect to each other. It is, however, possible to calibrate the system and to compute the rotation and translation matrix between the coordinate systems attached to each sensor. Based on this transformation matrix, the depth image can be registered to the 2D image, such that registered depth and color images have the same size, resolution, and reference coordinate system.

Furthermore, using camera calibration information, the detected landmarks as well as all depth image pixels may be mapped from camera coordinates into world coordinates. The world coordinate system is defined with respect to a virtual sensor mounted at a pre-defined position and perfectly aligned with the scanner coordinate system. In the scanner coordinate system, the axes are also aligned with the patient support.

The depth map gathered by the depth camera gives information about the overall surface height of a patient at every position above the patient support (MR table 18 or CT couch 110). A depth map consists of a 2D image, wherein the pixel intensity codes the distance along the optical axis between the optical center of the camera and the object.

By obtaining a depth map of the empty patient support (a "patient support depth map"), taken before placing the patient on the table, subtracting the patient support depth map from the patient depth map creates an "altitude map" representing the height above the table including the patient, clothes, devices and potentially blankets.

The exact thickness of the patient is not known and differs from this altitude because the side of the subject that is lying on the patient support does not exactly fit the outer surface of the empty patient support. Additionally, when soft mattresses or cushions are used, they are likely to be compressed by the lying subject, which is another reason for differences between the computed altitude and the true patient thickness.

In each case, a controller 202 processes the 2D camera image and the depth camera image in the manner explained in detail below in order to obtain a true patient depth. A display 204 is provided for displaying information relating to the vertical depth of the patient as also explained below. This display may be an existing display of the operator console 30 or 118 or it may be an additional display.

The controller 202 also has a direct connection to the system controller (i.e. the console 30 or 118) to provide patient depth information to the operator, for example a determined vertical center (as discussed below). This gives the operator the possibility to adjust the system manually and to also automatically set the respective parameters, e.g. table height for CT scanning.

The true patient depth is obtained using reference thickness data rather than attempting to measure the true thickness. This reference data is used to generate a statistical model relating the altitude as explained above and the thickness of a subject lying on the patient support. This statistical model forms part of a template which is used to process the altitude map.

The reference data may be obtained using tomographic scans of medical examinations, e.g. obtained with CT or MR scanners. Thus, medical imaging scans may be used to produce the ground truths. With this historical patient data, it is possible to segment the body outline of the subject and therefore to compute a thickness map for different locations of the body. The corresponding altitude map for these reference scans can be obtained from depth data acquired simultaneously or by simulating a depth map from the 3D tomographic data.

In an alternative example the function of mapping from the depth parameter to the thickness value can be also based on results derived from a trained neural network using historical patient data pertaining to specific patient measurements.

Figure 3:
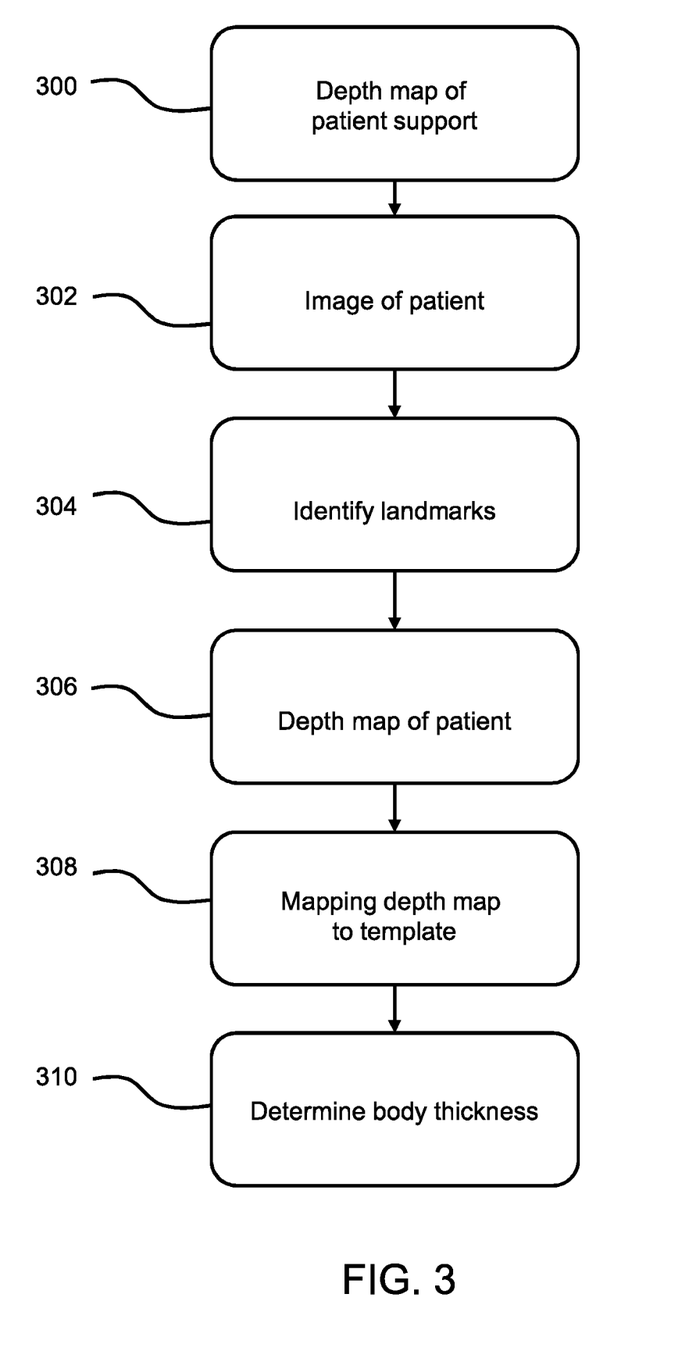
FIG. 3 shows the method employed by the system of FIGS. 1 and 2.

FIG. 3 shows the method employed by the systems of FIG. 1 or 2. The method is generally for obtaining body depth information for a patient who is lying on a patient support 18, 110 (with a known body orientation).

In step 300, a patient support depth map is obtained of the upper surface of the patient support without the patient, using the depth camera.

In step 302, a 2D image is obtained of the patient lying on the patient support using an overhead camera.

In step 304, landmark body positions of the patient are extracted from the image by suitable image processing.

In step 306, a patient depth map of the upper surface of the patient is obtained using the depth camera.

The 2D image and the depth maps are registered to each other either in hardware or by software calibration so that the locations of identified features in the 2D images (i.e. the landmark body positions) are known in the field of view of the depth camera. The images are for example processed for noise reduction and for interpolation of missing depth values The purpose of the landmark body positions is to enable appropriate body locations of a number of patients to be linked with one another, in particular so that a statistical analysis of the correlation between the measured altitude above the patient support and the actual thickness of the patient's body can be derived.

Color images are for example used to detect landmark body positions for example using a convolutional neural network (CNN). The landmarks are for example the center of the head, shoulders, elbows, wrists, hips (approximately the location of the femoral heads), knees and ankles. Apart from the head landmark, the CNN distinguishes between left and right for all landmarks. Algorithms are known for identifying such landmark body positions.

After mapping the identified landmarks positions into the world coordinate system, a 3D bounding box may be computed on the basis of the 3D landmark coordinates. The bounding box is for example enlarged by 200 mm in upper direction (towards the ceiling) and 300 mm in lower direction (towards the floor). In all other directions (left, right, feet, head), the 3D bounding box is enlarged by 150 mm. This bounding box then defines a 3D region of interest (ROI) for the subsequent calculations.

In order to increase the robustness of the algorithm with respect to noise and outliers in the original depth map, a filtering step is performed to reject outlier depth values. Undefined values may be filled using the closest well-defined value in the vicinity.

Figure 4:
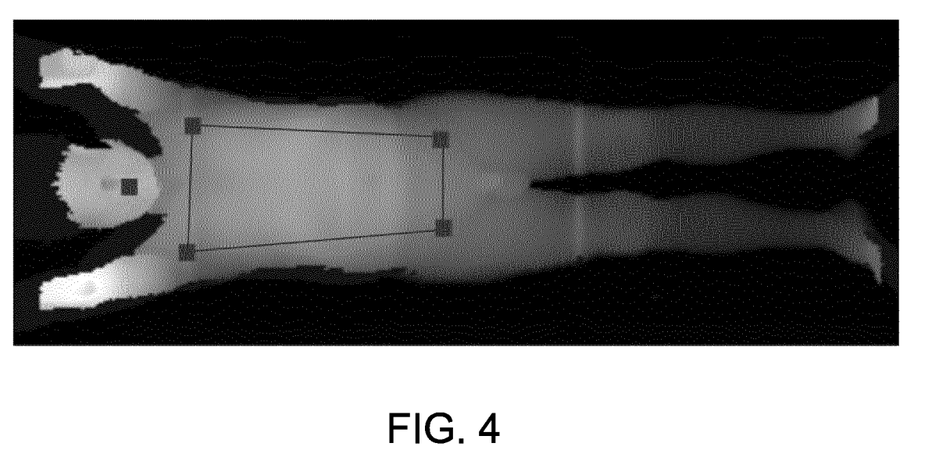
FIG. 4 shows a 2D image from which the locations of the head, shoulders and hips have been identified by image analysis.

FIG. 4 shows a 2D image from which the locations of the head, shoulders and hips have been identified by image analysis. These body locations are for example suitable for imaging the abdomen of a patient. More landmarks may of course be used, or a different set of landmarks.

A 2D mesh of points may then be generated based on these landmarks, such that every grid point corresponds to a specific part of the patient's body. The mesh is reformatted to a standardized mesh, i.e. a template, so that the grid points of multiple altitude maps can be correlated to one another.

The corners of the torso area are defined by the shoulders as well as the hips. Between these landmarks a bilinear grid of e.g. 80×40 points is for example generated. The mid points between the shoulders and the hips are may also be used to define a mesh in the head and pelvis areas. The pelvis mesh is a perpendicular continuation of the torso mesh for example with size 40×40 mesh points. The head area may also have a size of 40×40 mesh points.

Returning to FIG. 3, the altitude map explained above (or else the patient depth map and the patient support depth map) is mapped to this standardized template in step 308. This involves mapping points in a region of interest of the depth map to points of the template, using the identified landmark body positions. The measured depth map is thus warped to fit the standardized mesh, by aligning the landmark body positions.

The standardized template defines functions which can be used to convert the measured altitude values to the ground-truth thickness for each point.

Figure 5:
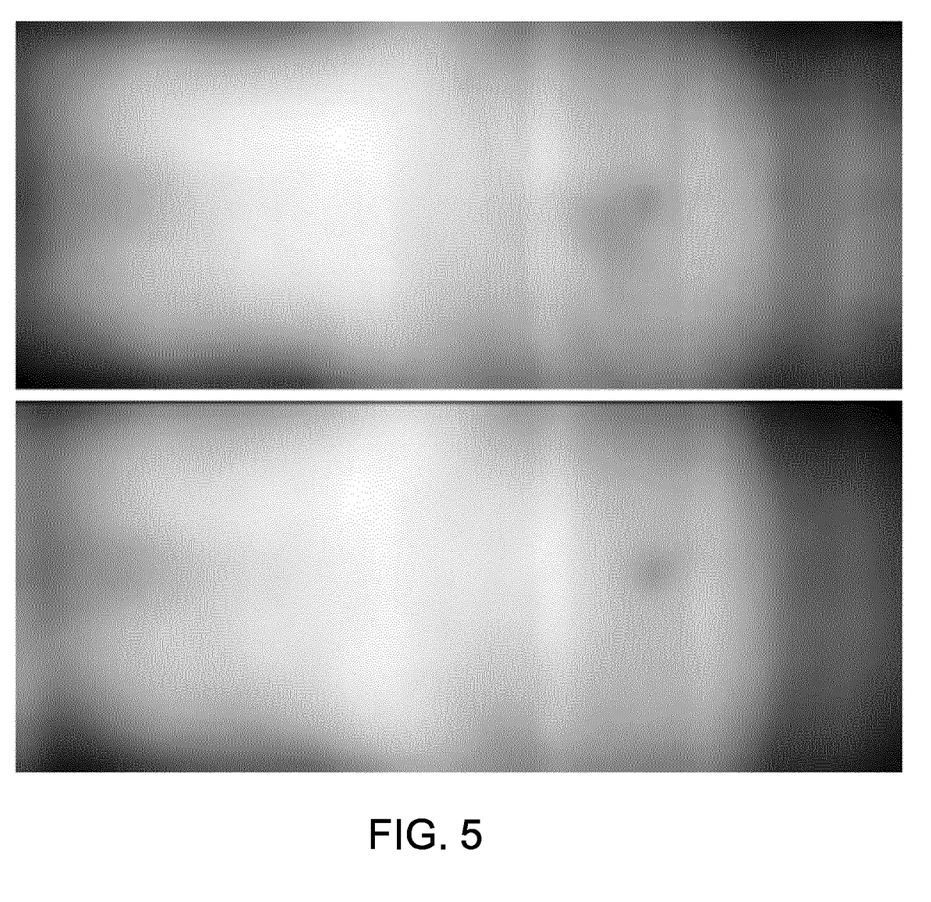
FIG. 5 shows an altitude map reformatted to enable correlation with a standardized mesh, and a conversion of the reformatted altitude map to a thickness map.

The top part of FIG. 5 represents the altitude map reformatted to enable correlation with the standardized mesh, and the bottom part of FIG. 5 represents the conversion of the reformatted altitude map to a thickness map representing the actual patient thickness at each point. This conversion is based on a statistical model derived from the reference data.

The use of the mesh thus comprises the mapping of points of the depth map (in particular the altitude map), or just a region of interest of the altitude map, to points of a template which is a standardized mesh, using the identified landmark body positions. Thus, the altitude map is effectively warped to fit the identified landmarks to the template.

As shown in FIG. 3, the method comprises in step 310 determining a body thickness for said points using the template, and the altitude map (which itself is based on the patient depth values and the patient support depth values).

By evaluating a sufficient number of historical data sets, it is possible to develop a statistical model that predicts the thickness for each grid point of the based on the measured altitude in those historical scans.

Figure 6:
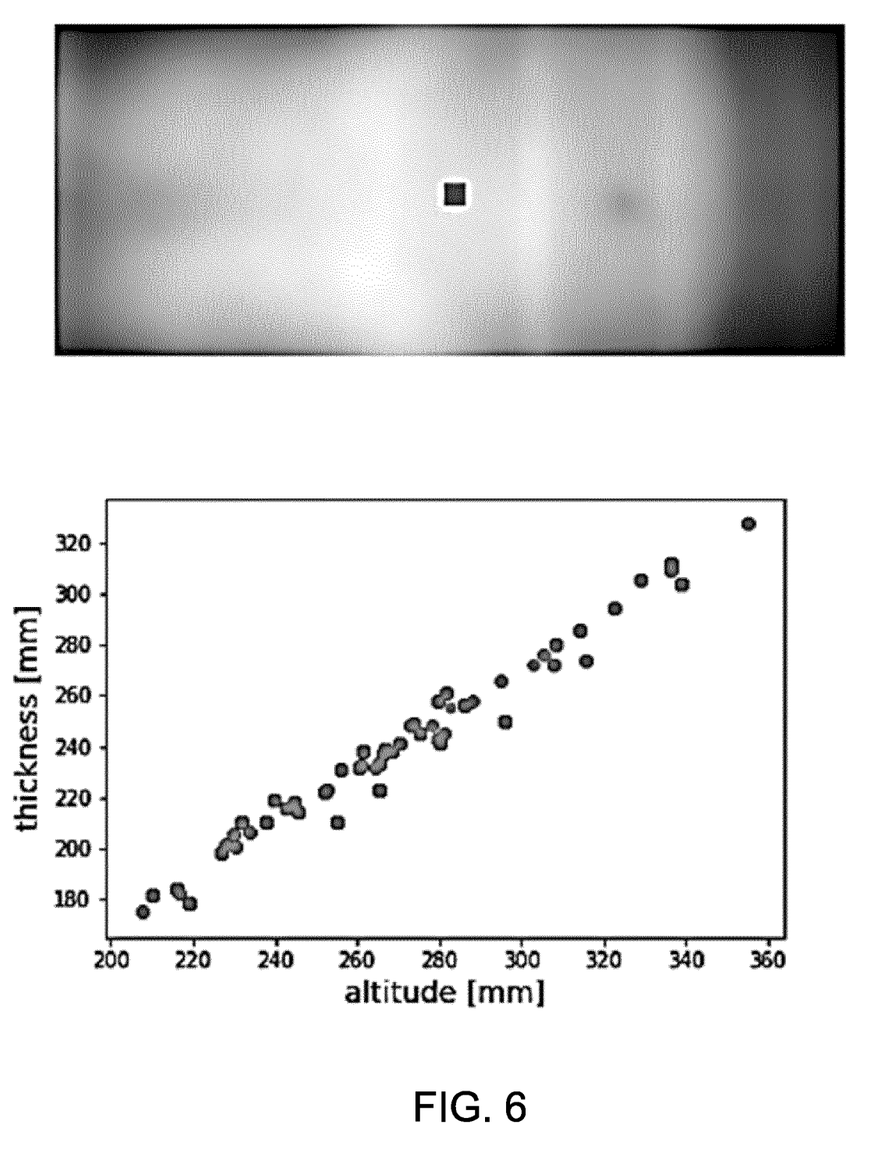
FIG. 6 shows in the top image an example mesh point over the reformatted altitude map and in the bottom image the correspondence between the altitude and thickness for this exemplary point.

FIG. 6 shows in the top image an example mesh point over the reformatted altitude map.

The bottom image shows the correspondence between the altitude (i.e. height above the empty patient support) and body thickness for this exemplary point, from 57 historical data samples.

It shows a clear linear relationship between the measured altitude and the body thickness. This is of course expected. The linear relationship is defined by the slope and intersect (e.g. with the y-axis). Thus, each mesh point of the template may be allocated a slope and intersect value, which can then be used to convert the measured altitude to a true body thickness at that point.

The statistical model can also take account of additional prior information, such as the type of matrasses lying on the patient support, or the type of clothes the patient is wearing, which might influence the relation between altitude and thickness. Thus, there may be multiple pairs of intersect-slope values for different conditions (mattress type, clothing bulk etc.). There may also be different functions for different patient types (male, female, age range etc.) to represent different typical body shapes, which will in turn influence how the gap is formed beneath the patient over the patient support.

The function shown in FIG. 6 is a function for one of the mesh points, and it maps from a depth value (in particular the altitude) to a body thickness value. The slope and intersect forms a linear regression, i.e. a line of best fit. Thus, the depth at each point is converted to a thickness value, based on historical patient data.

More complex statistical models, like support vector machines, could be used alternatively. Machine leaning algorithms may instead be used.

The thickness map obtained by the statistical model enables an overall vertical center to be calculated for given scan range (e.g. the head, the abdomen etc.).

For each single point, the vertical center is positioned at, e.g., half of the body thickness underneath the surface of the body or, in case the target anatomy is not centered in the body at a specified ratio of the body thickness. Since the altitude map based on the depth camera includes also clothes, blankets etc. above the patient's body, this is compensated by the functions for each mesh point of the template, forming the statistical model.

The vertical center of an entire scan range can be obtained by considering all altitude and thickness values in the given region. This vertical center value enables the most suitable alignment to be provided between the patient support and the scanner, or else it may be used to select other scan parameters.

For example, an optimal patient table height in a CT examination is the height that will align the isocenter line of the patient (in the foot-head direction) with the isocenter line of the CT gantry.

There are different possibilities for defining an overall vertical center position. It can for example be regarded as the average of all vertical centers of the given grid points in the region of interest, or it may be obtained based on differently weighted grid points. The use of a weighted average means that the outer regions of the scan area in the x-y direction might be weighted less than the more central points, since organs to be scanned are typically placed in the center of the scan range.

For an application to CT scanning for example, for each axial slice of the mesh, the vertical center of this slice may be obtained by computing the highest and lowest points above the patient support (or selecting points which are determined to be representative of the highest and lowest points, as explained below) and then computing their vertical center.

For example, for each slice (extending across the width of the body) the sequence of lowest points is computed. The calculation of the vertical center may be different for different body regions. For example, in the head region, the lowest of these values may be used. In the torso and pelvis regions, a quantile of 10% of the lowest values may be removed from the sequence and the lowest value of the remaining sequence may then be retained. This ensures that single outlier depth values do not have an impact on the final vertical center computation.

From a sequence of upper values, the same technique may be used to compute the highest point. Thus, representative highest and lowest points are determined. Based on the determined representative lowest depth and highest depth, a vertical center (half way between the two representative values) is obtained for that axial slice.

The mean of these vertical centers along the pre-set scan range (typically along the foot-head direction of the subject i.e. along the body axis) is computed. This represents an overall vertical body center position which may for example be used to set the patient support height. A patient support height setting may be output based on this overall vertical body center position.

By combining the patient depth map and the patient support depth map (of the empty patient support) the resulting vertical center of each axial slice can be displayed in a sagittal or axial overview image.

Figure 7:
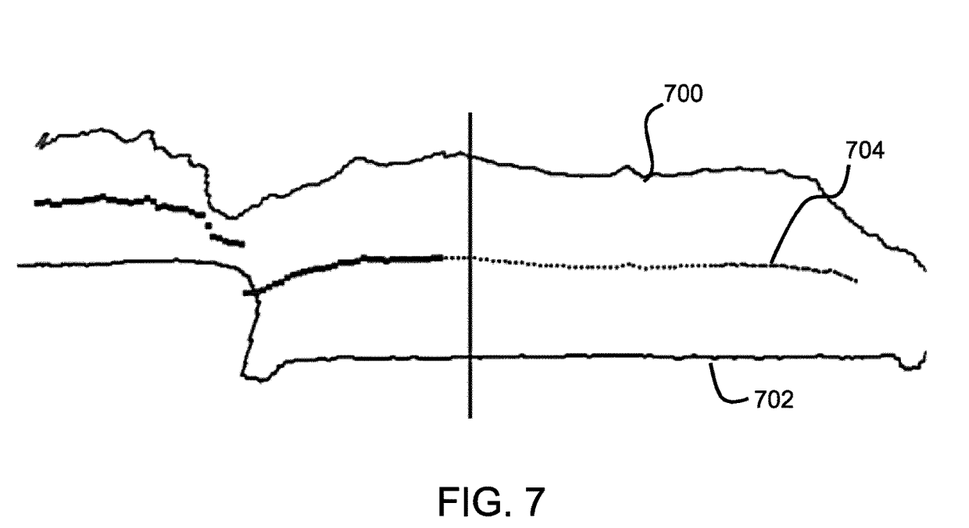
FIG. 7 shows a sagittal image of the depth map, the patient support and the vertical center line of the body.
Figure 8:
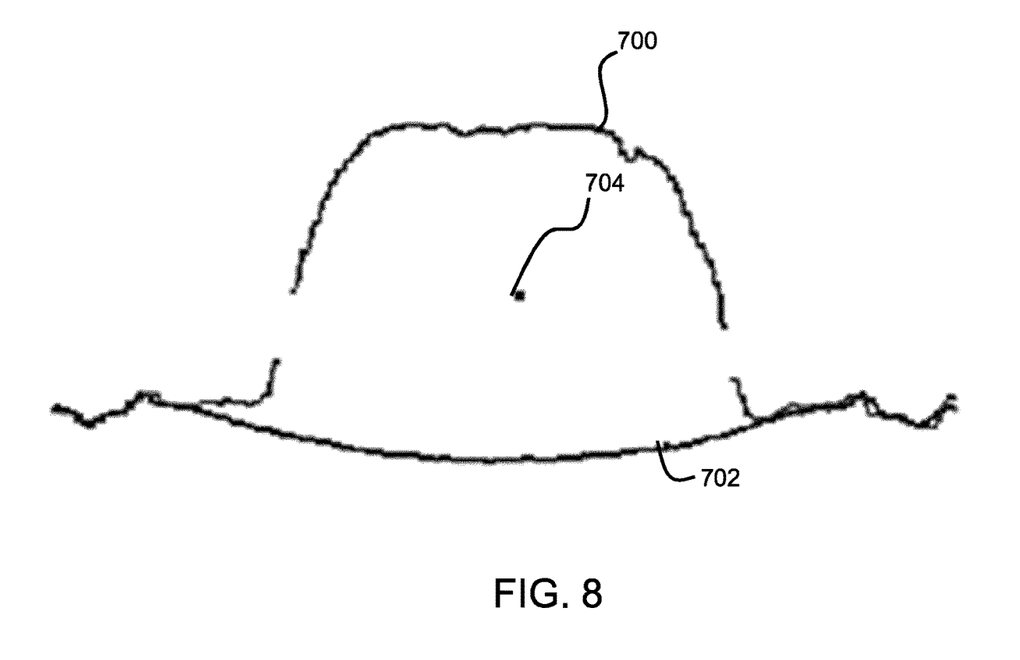
FIG. 8 shows an axial image for the slice represented in FIG. 7.

FIG. 7 shows a sagittal image of the patient depth map 700, the patient support depth map 702 and the vertical center line 704 of the body. FIG. 8 shows an axial image for the vertical slice represented in FIG. 7.

The images thus represent the patient depth map, the patient support depth map and one or more estimated vertical center positions. This may be used by a scanner technician to set the most suitable height for the patient support. As mentioned above, this information may instead be used to set the magnetic field strength for use in MR imaging.

Other images may be derived from the patient depth map, the patient support depth map and one or more estimated vertical center positions. For example, from the depth map, a point cloud of the relevant body surface may be computed, and this point cloud may then be used to generate sagittal or axial views of the body upper and lower surface.

It is explained above that it is important to know the vertical height of the center of the region to be imaged. In addition, it is important to know the approximate volume and weight of a patient. This parameter is for example used to adjust the X-ray dose, or to specify the specific absorption rate and thus optimize the RF cycles during MR data acquisition, which can translate into shorter scan times.

It is also a useful input parameter to determine the amount of a contrast agent to be administered, which is necessary to visualize certain characteristics. The less volume a patient has, the less X-ray dose and contrast agent is necessary. Since X-rays in particular enhance the risk of cancer, it is a major issue to avoid exposing a patient to a high dose, if it is not necessary.

The standard method to obtain a patient's volume is to ask for their weight. The density of a human body only varies minimally, which means that it strongly correlates to volume. However, there are some limitations. One of them is that a patient is not necessarily able to communicate their weight. A reason may be unconsciousness or simply a lack of knowledge about the exact actual weight. Even if a patient thinks they knows their weight, the information might not be very exact.

In these cases, the clinical staff can estimate the approximate weight based on the visual appearance, which is most likely at least slightly inaccurate.

Even if it is possible to obtain the exact weight and volume of a patient, this does not give exact information about the volume of specific body parts that are being scanned. The proportions of different body parts can vary significantly between different patients, meaning that e.g. for abdomen scans, the scanned volume might be diverse, even if the overall volume of the patient is the same. Some patients have a significant amount of fat concentrated around the abdomen, while for others it is distributed over the entire body. Thus, having information about the patient's weight is not sufficient to determine the ideal radiation or contrast agent dose.

The depth maps acquired using the depth camera as discussed above may also be used to derive local or overall volume information, which may then be used for dose planning in CT scanning and for the SAR optimization in MR scanning.

As shown in FIG. 4, the thickness calculations may be used to generate a thickness map, which is then used for the vertical center calculations. This thickness map may additionally be used to determine the volume of the body within a given scan area. This may be achieved simply by summing the thickness values for pixels (which correspond to known surface area) of the thickness map in the given scan range.

As explained above, prior information about matrasses or clothing or other devices (e.g. positioning devices like head or foot supports) can be incorporated in the computation of the thickness map to increase the accuracy of the prediction. This prior information can come from the captured images as explained above but also from system parameters (e.g. which coil is currently used, or the current table position). Typically, the list of devices that can be used in examinations is known for a given system, and 3D models of these devices can be created and stored.

If the weight of the patient is known, this will give an approximate volume, which can also be used as information in the first estimation step, e.g. for removing obstacles or devices. In the refinement step, this information can be used as an additional input layer.

Figure 9:
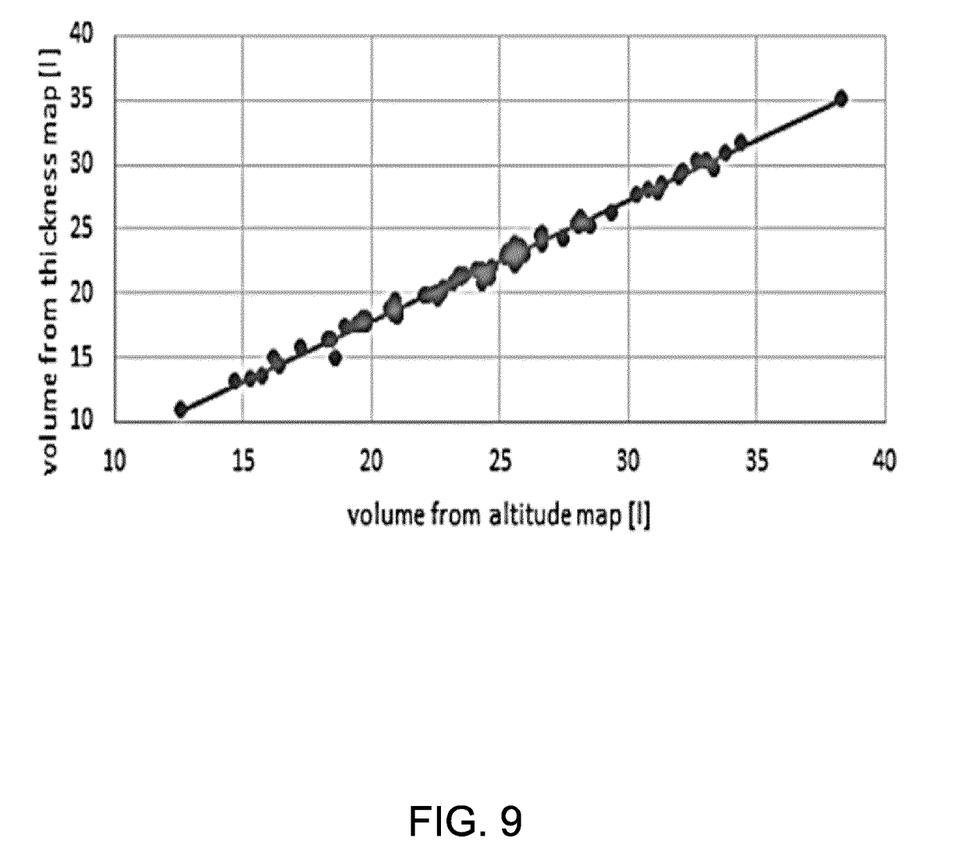
FIG. 9 shows a relationship between a patient volume estimation based only on the altitude map (x-axis) and a volume based on a thickness map (y-axis).

In a similar manner to FIG. 6, FIG. 9 shows a relationship between a patient volume estimation based only on the altitude map (x-axis) and a volume based on a thickness map (y-axis). The example of FIG. 9 is based on the volume of the abdomen from the depth data and with comparison with the true thickness estimated from a volumetric CT data for different subjects.

Thus, a volume may be estimated by first determining a volume from the altitude map then converting to a body volume using a single function, rather than applying a function to each point of the altitude map as in the example above.

The volume estimation method then involves obtaining body volume information for a patient who is lying on patient support, and the method comprises:

obtaining a patient support depth map of the upper surface of the patient support without the patient using a depth camera;

obtaining a patient depth map of the upper surface of the patient on the patient support using the depth camera;

determining a thickness value at a set of points of a region of interest based on the patient support depth map and the patient depth map;

determining a volume estimate of the region of interest from the thickness values for the set of points and a mapping function.

The method may comprise first determining a first volume estimate of the region of interest from the thickness values for the set of points and then mapping from the first volume estimate to a second volume estimate using a (single) mapping function.

This mapping function is then that shown in FIG. 8 and may be derived from the ground truth data obtained from historical scan data. The set of thickness values is the altitude map explained above.

The more accurate volume estimate may for example be used to adjust the X-ray dose or specify the SAR and thus optimize the RF cycles during MR data acquisition.

The method may also use 2D image analysis and thus may comprise:

obtaining an image of the patient on the patient support using an overhead camera; and identifying landmark body positions of the patient from the image.

These landmark body positions enable anatomical information to be associated with the different regions of the depth map, for example so that void areas (which are blocked from the view of the depth camera) are filled using anatomical knowledge.

The volume calculation may make use of body thickness values at each point, hence using a local mapping function for each point, in the manner as explained above.

In that case, the method may comprise (instead of a single global volume mapping function):

mapping points in the region of interest to points of a template, using the identified landmark body positions;

determining a body thickness for said points using the template, the patient depth value for the respective point and the patient support depth value for the respective point; and determining a volume of the region of interest from the body thickness values.

The mapping of points to points of a template again may then comprise warping the depth map by fitting landmark body positions of the template to the identified landmark body positions.

The invention provides a camera-based approach which is able to automate and standardize the complete patient set-up, in which patient orientation, horizontal range of the CT localizer scan and optimal vertical couch height position may be derived from depth images acquired by a 3D camera system and optionally also 3D images.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

If the term "adapted to" is used in the claims or description, it is noted the term "adapted to" is intended to be equivalent to the term "configured to".

Any reference signs in the claims should not be construed as limiting the scope.

The invention claimed is:

1. A method of obtaining body depth information for a patient situated on patient support, comprising:

obtaining a patient support depth map of an upper surface of the patient support without the patient using a depth camera;

obtaining an image of the patient lying on the patient support using the depth camera;

identifying landmark body positions of the patient from the image;

obtaining a patient depth map of an upper surface of the patient situated on the patient support using the depth camera;

mapping points in a region of interest to points of a template using the identified landmark body positions; and determining a body thickness for the points in the region of interest using the template, a patient depth value for each respective point in the patient depth map, and a patient support depth value for each respective point in the patient support depth map.

2. The method of claim 1, wherein the template comprises a statistical model, the model comprising a function for each of the points enabling a mapping from a depth parameter to a thickness value based on historical measurements of patients on patient supports.

3. The method of claim 2, wherein a vertical center position is determined for each of the points as the patient depth value lowered by an anatomy specific ratio of the body thickness.

4. The method of claim 3, further comprising displaying an image derived from the patient depth map and the patient support depth map, each representing the body upper and lower surfaces.

5. The method of claim 1, wherein mapping points to points of the template comprises warping the depth map by fitting landmark body positions of the template to the identified landmark body positions.

6. The method of claim 1, wherein determining a body thickness for the points comprises using a statistical model defined by the template, the model comprising a function for each of the points which maps from a depth parameter to a thickness value.

7. The method of claim 6, wherein the statistical model implements a mapping between (i) a depth difference between the patient depth value and the patient support depth value at a point and (ii) the patient body thickness at the point.

8. The method of claim 1, comprising determining an overall vertical body center position from the body thickness for the points.

9. The method of claim 8, wherein determining the overall vertical body center position comprises obtaining an average body center position for all of the points or a weighted average body center position for all of the points.

10. The method of claim 8, wherein determining the overall vertical body center position comprises:

determining a slice center position for each of a set of parallel slices; and obtaining the overall vertical body center position as the average slice center position for all slices.

11. The method of claim 10, wherein each slice is perpendicular to a body axis of the patient, and the average slice center position is taken for multiple slices in the body axis direction.

12. The method of claim 1, further comprising obtaining a volume of a region of interest of the patient using the body thickness for the points.

13. A system for obtaining body depth information for a patient situated on patient support, comprising:
- a depth camera configured to:
  - obtain a patient support depth map of an upper surface of the patient support without the patient;
  - obtain an image of the patient situated on the patient support;
  - obtain a patient depth map of the upper surface of the patient situated on the patient support;
- at least one processor configured to:
  - identify landmark body positions of the patient from the image;
  - map points in a region of interest to points of a template using the identified landmark body positions; and
  - determine a body thickness for the points in the region of interest using the template, a patient depth value for each respective point in the patient depth map, and a patient support depth value for each respective point in the patient depth map.

14. The system of claim 13, wherein the at least one processor is further configured to derive a desired position of the patient support, and to control the position of the patient support to adopt the desired position.

15. The system of claim 13, further comprising a display for displaying an image representing the patient depth map, the patient support depth map and one or more estimated vertical center positions.

* * * * *